US010726415B2

(12) United States Patent
Kopczynski et al.

(10) Patent No.: US 10,726,415 B2
(45) Date of Patent: Jul. 28, 2020

(54) TOKEN-BASED TRANSACTION SYSTEM AND METHOD TO FACILITATE NON-CASH PAYMENTS WITHOUT USING PERSONALLY IDENTIFIABLE INFORMATION DATA

(71) Applicants: Tyson Kopczynski, Belmont, CA (US); Daniel Chiang, Mountain View, CA (US)

(72) Inventors: Tyson Kopczynski, Belmont, CA (US); Daniel Chiang, Mountain View, CA (US)

(*) Notice: Subject to any disclaimer, the term of this patent is extended or adjusted under 35 U.S.C. 154(b) by 457 days.

(21) Appl. No.: 14/714,668

(22) Filed: May 18, 2015

(65) Prior Publication Data
US 2016/0042345 A1 Feb. 11, 2016

Related U.S. Application Data

(60) Provisional application No. 62/008,964, filed on Jun. 6, 2014.

(51) Int. Cl.
*G06Q 20/38* (2012.01)
*G06Q 20/36* (2012.01)
(Continued)

(52) U.S. Cl.
CPC ......... *G06Q 20/3678* (2013.01); *G06Q 20/20* (2013.01); *G06Q 20/3278* (2013.01); *G06Q 20/3829* (2013.01); *G06Q 20/4014* (2013.01)

(58) Field of Classification Search
CPC .................................................. G06Q 20/348
(Continued)

(56) References Cited

U.S. PATENT DOCUMENTS

| | | | |
|---|---|---|---|
| 2003/0028481 A1* | 2/2003 | Flitcroft | G07F 19/00 705/39 |
| 2003/0028484 A1* | 2/2003 | Boylan | G06Q 20/04 705/40 |

(Continued)

*Primary Examiner* — Chinedu C Agwumezie
(74) *Attorney, Agent, or Firm* — Steven M. Greenberg, Esq.; Shutts & Bowen LLP (57) ABSTRACT

A system and method for token-based transactions to facilitate non-cash payments without using personally identifiable information data is disclosed. The system generally includes at least one computer processor and a module, which when executed by the at least one computer processor, causes the computer processor to exchange data representative of a request for identification with a computing device of a Payer Entity. The computer processor generates a signed Digital Debt Obligation, including purchase metadata comprising currency and at least one preferred payment provider, and sends the signed digital debt to the computing device of the Payer Entity. The computer processor receives data representing an approved Digital Debt Obligation from the computing device of the Payer Entity and verifies the approved Digital Debt Obligation. The computer processor sends data representative of the approved Digital Debt Obligation to a Payment Processor and queries the Payment Processor for supported payment methods. The computer processor then submits the approved Digital Debt Obligation to a payment provider's service entry point to complete the transaction.

3 Claims, 8 Drawing Sheets

(51) Int. Cl.
*G06Q 20/20* (2012.01)
*G06Q 20/32* (2012.01)
*G06Q 20/40* (2012.01)

(58) Field of Classification Search
USPC .......................................................... 705/75
See application file for complete search history.

(56) References Cited

U.S. PATENT DOCUMENTS

| | | | |
|---|---|---|---|
| 2005/0125338 A1* | 6/2005 | Tidwell ................. | G06Q 20/10 705/39 |
| 2009/0182654 A1* | 7/2009 | Mullen ................. | G06Q 20/40 705/30 |
| 2012/0101951 A1* | 4/2012 | Li ....................... | G06Q 20/3223 705/71 |
| 2013/0132275 A1* | 5/2013 | Enzaldo ............. | G06Q 20/4016 705/44 |
| 2015/0286997 A1* | 10/2015 | Zimmerman .......... | G06Q 20/10 705/39 |

* cited by examiner

TOKEN-BASED TRANSACTION SYSTEM AND METHOD TO FACILITATE NON-CASH PAYMENTS WITHOUT USING PERSONALLY IDENTIFIABLE INFORMATION DATA

CROSS-REFERENCE TO RELATED APPLICATION

This application claims priority to U.S. Provisional Patent Application Ser. No. 62/008,964, filed Jun. 6, 2014.

BACKGROUND

The use of credit/debit cards is ubiquitous in today's physical and e-commerce markets. The average consumer owns over three credit cards and executes non-cash transactions on a daily basis. Unknowingly to most consumers, credit, debit, and other relevant account data is being recorded and stored anywhere and everywhere whenever such transaction takes place. As a result, transaction data is easily stolen, leading to financial loss, identity theft and other criminal activity. The Federal Trade Commission has identified identity theft as the number one consumer complaint each year. Simply put, current consumer payment methodologies are inherently insecure and therefore potentially very costly to all parties involved in a transaction.

SUMMARY

In accordance with an aspect of the disclosure, a token-based system for facilitating non-cash payment transactions without using personally identifiable information data is disclosed. The system generally includes at least one computer processor and a module, which when executed by the at least one computer processor, causes the computer processor to implement a series of steps. Initially, the computer processor is operable to exchange data representative of a request for identification with a computing device of a Payer Entity, the data representative of a request for identification including an Immutable-ID associated with a Payee Entity and an Immutable-ID associated with a Payer Entity, the Immutable-ID associated with the Payee Entity and Immutable-ID associated with the Payer Entity being assigned by a trusted third computing device. The computer processor generates a signed Digital Debt Obligation, including purchase metadata comprising currency and at least one preferred payment provider, and sends the signed Digital Debt Obligation to the computing device of the Payer Entity. The computer processor associated with the Payer Entity receives data representing an approved Digital Debt Obligation from the computing device of the Payer Entity and verifies the approved Digital Debt Obligation. The computer processor sends data representative of the approved Digital Debt Obligation to a Payment Processor and queries the Payment Processor for supported payment methods. The computer processor then submits the approved Digital Debt Obligation to a payment provider's service entry point.

In accordance with another aspect of the disclosure, a computerized method is provided for facilitating non-cash payments between entities without using personally identifiable information data. The method generally comprises exchanging data representative of a request for identification with a computing device of a Payer Entity, the data representative of a request for identification including an Immutable-ID associated with a Payee Entity and an Immutable-ID associated with a Payer Entity, the Immutable-ID associated with the Payee Entity and Immutable-ID associated with the Payer Entity being assigned by a trusted third computing device. A signed Digital Debt Obligation including purchase metadata comprising currency and at least one preferred payment provider is then generated by at least one computer processor. The signed Digital Debt Obligation is sent to the computing device of the Payer Entity. Next, the computer processor receives data representing an approved Digital Debt Obligation from the computing device of the Payer Entity and verifies the approved Digital Debt Obligation. Data representative of the approved Digital Debt Obligation is then sent to a Payment Processor and the Payment Processor is queried for supported payment methods. The approved Digital Debt Obligation is then submitted to a payment provider's service entry point.

In accordance with these and additional aspects that will become apparent hereinafter, the present disclosure will now be described with particular reference to the accompanying drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

Specific embodiments of the disclosure will now be described in detail with particular reference to the accompanying figures. For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In the following detailed description of embodiments of the disclosure, numerous specific details are set forth in order to provide a more through understanding of the disclosure. However, it will be apparent to those skilled in the art that the disclosure may be practiced without these specific details. In other instances, well-known features have not been described in detail to avoid unnecessarily complicating the description.

Figure 1:
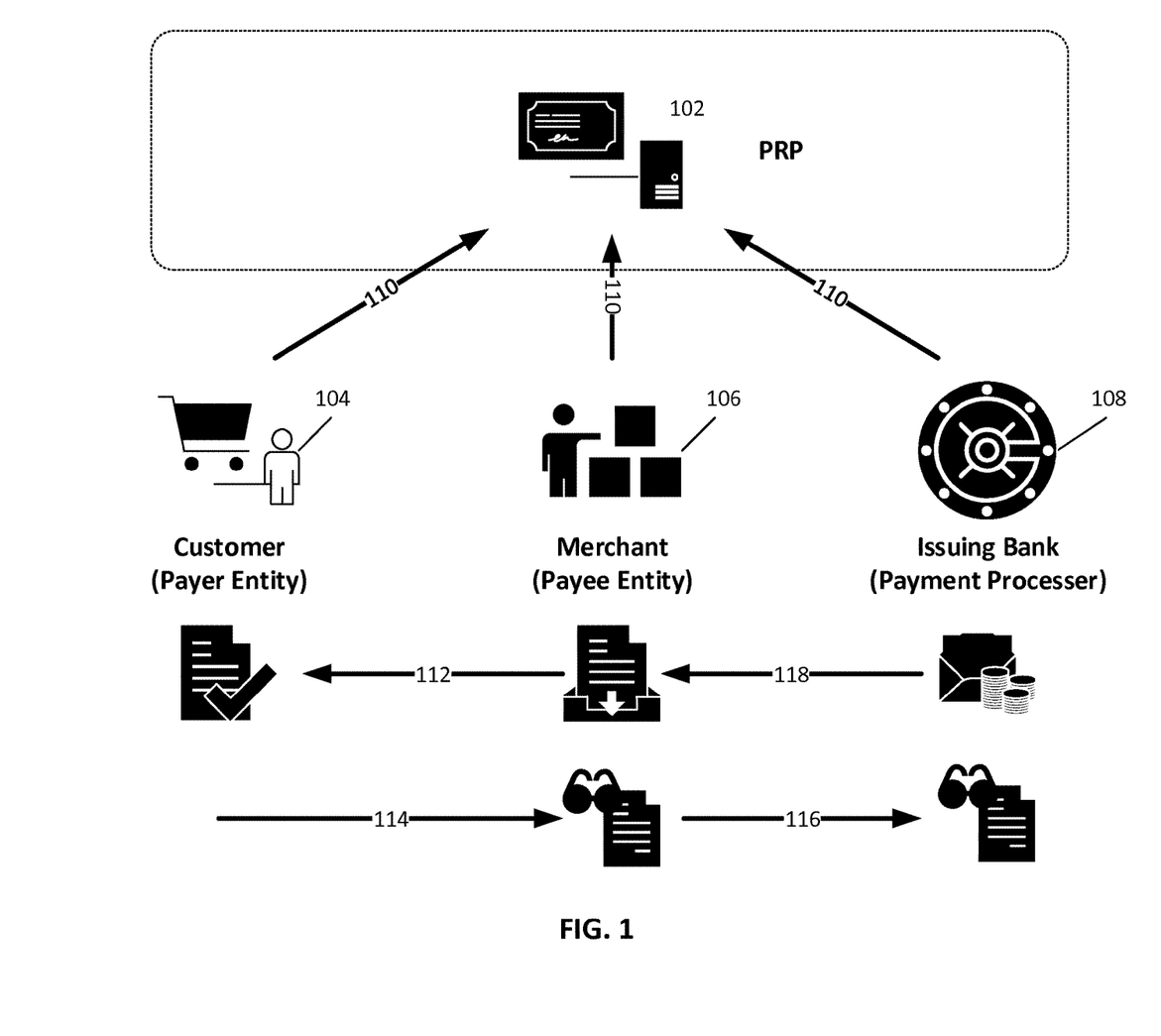
FIG. 1 is a high-level schematic diagram of an overview of an exemplary system architecture of a token-based transaction system in accordance with aspects of the disclosure.

Referring to FIG. 1, there is depicted an overview of an exemplary system architecture of a token-based transaction system 100 for facilitating non-cash payments between entities without using personally identifiable information data. System 100 includes a Payment Root Provider (PRP) 102 that operates as a trusted third party (TTP) for transactions, and serves as a root of trust for the system. A customer 104 (Payer Entity), purchases goods and/or services from a merchant 106 (Payee Entity). An issuing bank 108 (Payment Processor) is a computerized entity that processes payment and transfers funds to merchant 106 for the purchased goods and/or services. In accordance with an aspect of the disclosure, Payer Entity 104, Payee Entity 106 and Payment Processor 108 join (as represented by reference numeral 110) a trusted framework that enables tokens without any masked or unmasked personally identifiable data (PII) or sensitive data to be passed between the respective entities. The system 100 provides for passing a notification "I-O-U" between the entities that characterizes a payment to be made. Such a token is referred to herein as a Digital Debt Obligation (DDO), which is devoid of any PII. When a Payer Entity 104 makes a purchase from a Payee Entity 106, the Payee Entity 106 provides a DDO 112 to Payer Entity 106. If the Payer Entity chooses to approve the transaction, the DDO 112 is digitally signed 114 and communicated back to Payee Entity 106. Payee Entity 106 verifies DDO 114 and sends the verified DDO 116 to Payment Processor 108. Payment Processor 108 then verifies DDO 116, and upon verification, sends data representative of payment remittance to Payee Entity 106.

In accordance with an aspect of the disclosure, trust ratings are provided for each entity in the trusted framework. A trust rating is a numeric value that represents the trust level of an entity. The trust rating is dynamically generated and based on completed transactions, submitted trust feedback related to completed transactions, and other relevant indicators of risk as monitored by PRP 102.

Trust feedback is an indicator of trust related to a DDO transaction. The trust feedback can be provided by any entity about another entity that is a party to a DDO transaction. For example, if Payment Processor 108 fails to complete a payment remittance associated with a DDO for a given transaction to Payee Entity 106, negative trust feedback can be submitted to the PRP 102 for that transaction. Similarly, if Payee Entity 106 fails to render services and/or deliver goods for a given transaction associated with a DDO, Payer Entity 104 can submit negative trust feedback for Payee Entity 106 to PRP 102 for that transaction. This data can be maintained in a global transaction log in the PRP 102.

Figure 2:
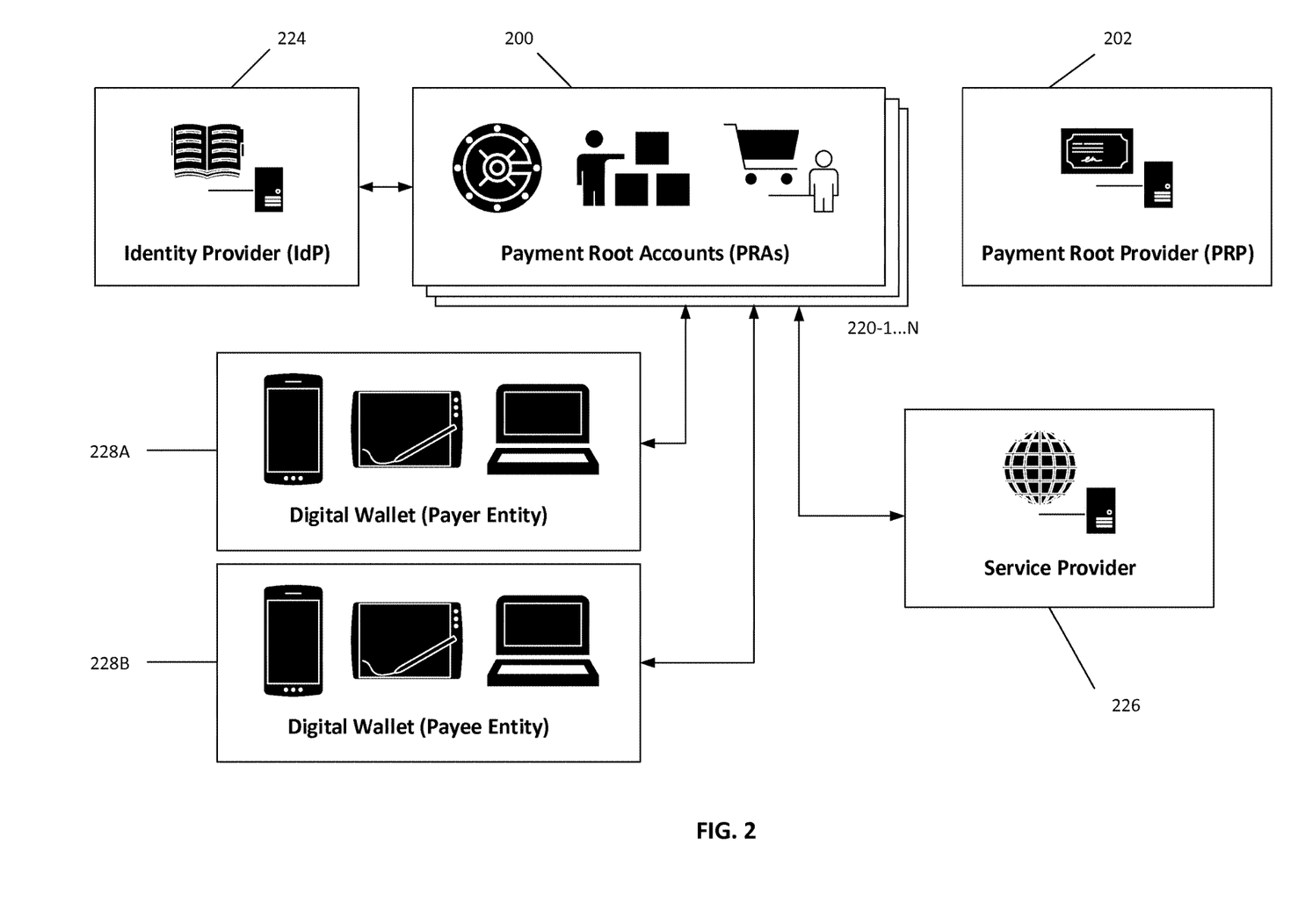
FIG. 2 is schematic diagram of an exemplary system architecture in further detail.

Referring to FIG. 2, there is depicted an exemplary system architecture 200 containing further details of a PRP 202. PRP 202 is analogous to a certificate authority in identity management ecosystems. In addition to functioning as the TTP, PRP 202 holds and manages a plurality of payment root accounts (PRAs) $220_1 \ldots _n$. A PRP 202 (or set of PRPs) must be universally accepted as trustworthy and managed by a central authority. PRPs 202 may be chained off the central PRP, or set of PRPs. If sub-PRPs are not universally trusted, then a central PRP acts as the trustworthy central authority. All entities in the system (Payer Entity 104, Payee Entity 106, and Payment Processor 108, see FIG. 1), are managed through the PRP 202.

An identity provider (IdP) 224 serves to authenticate Payer Entity 104, Payee Entity 106 and Payment Processor 108 in system 200. The IdP 224 facilitates authentication when an assertion regarding an entity is validated against attributes known to be associated with the entity. The IdP 224 verifies that entities are as represented in the system 200. IdPs 224 can be used that support existing standards, such as for example, Security Assertion Markup Language (SAML) and OpenID Connect. IdP 224 is either part of PRP 202 or executing on a separate device networked to PRP 202.

Each PRA 220 is associated with an entity that engages in token-based transactions in accordance with an aspect of the disclosure. All PRAs $220_1 \ldots _n$ held by a PRP can be segregated into the following types:

Individual: a PRA type that represents a live person who is authenticated by an external IdP.

Organization: a PRA type that represents a grouping of living people who are authenticated by an Organization's IdP.

In addition, all PRA types can have the following attributes:

Payer Entity 104: an entity that acts as the payer (buyer) for a token-based transaction.

Payee Entity 106: an entity that acts as the payee (merchant) for a token-based transaction. To be a payee, a PRA must go through a verification process to establish trust as a merchant.

An organization PRA type can also operate as Payment Processor 108, which is an entity that processes a payment for a token-based transaction. To operate in the system as a Payment Processor, Payment Processor 108 also undergoes a verification process to establish trust in the network.

With further reference to FIG. 2, a service provider (service point) 226 is a payment-processing service hosted by a Payment Processor 108. Service points 226 are chained off of a Payment Processor's PRA 220 and as such are represented in a PRP 202 as a special class of objects associated with a PRA 220. A Payment Processor's PRA 220 can be associated with multiple service points 226, which can all be referenced in the PRA 220 by a single URL.

Service points 226 permit payments through a digital wallet 228a associated with Payer Entity 104, and a digital wallet 228b associated with Payee Entity 106. The digital wallet is an application executing on a computing device to generate and sign tokens that are exchanged during a transaction. Digital wallets are not PRAs; they are chained off of a Payer Entity or Payee Entity PRA 220. As such, they are represented in a PRP 202 as a special class of objects associated with the PRA 220. In this regard, a PRA 220 can be associated with multiple digital wallets 228a, 228b.

The Payer Entity 104 and Payee Entity 106 use respective digital wallets 228a, 228b to enable a transaction. For example, a Payee Entity 106 (merchant) may employ a digital wallet associated with a Point of Sale (POS) device to process a sale. The Payer Entity 104 (buyer) uses a digital wallet 228a implemented as an application executing on a computing device to pay for items and/or services purchased in the transaction.

Figure 3A:
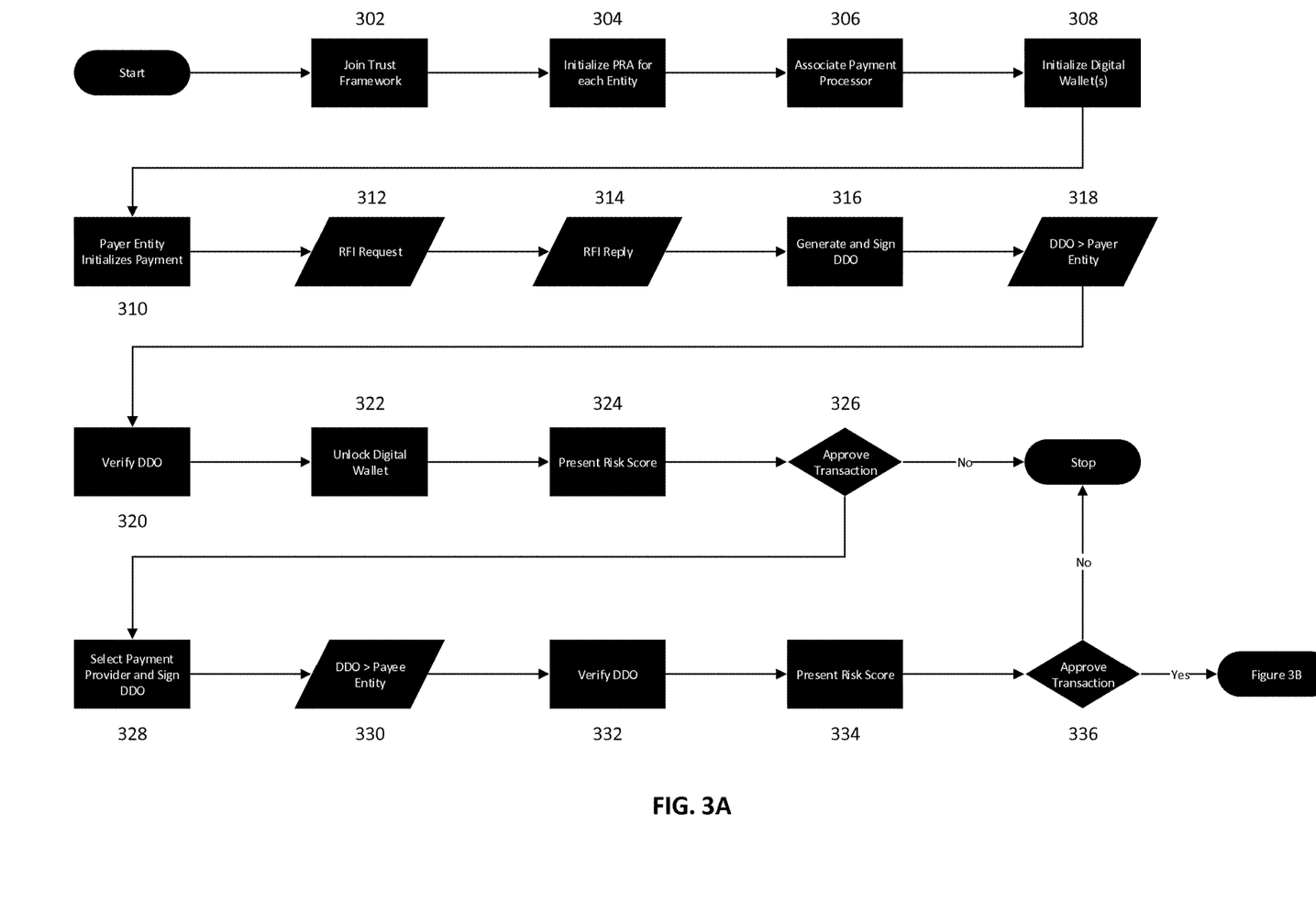
FIGS. 3A and 3B are high-level flow diagrams of an illustrative process in accordance with aspects of the disclosure.
Figure 3B:
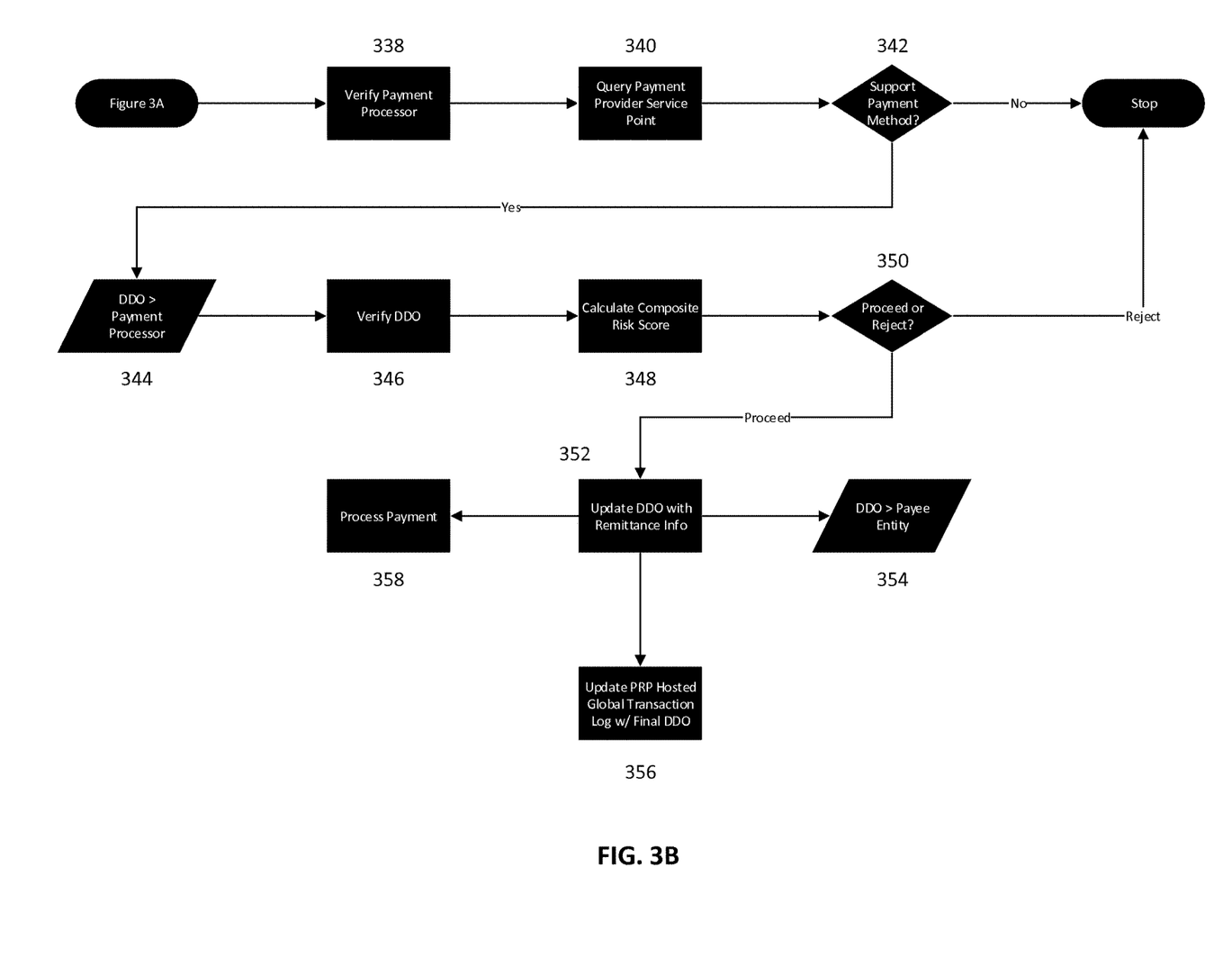

With reference to FIG. 3, there is depicted a high-level flow diagram of a process 300 in accordance with aspects of the disclosure for facilitating token-based transactions. In block 302, a Payer Entity 104, Payee Entity 106 and Payment Processor 108 join the trust framework. These respective entities establish a PRA as described above, and are each provided with an Immutable-ID, which is a globally unique identifier for each entity in the trust framework. The Immutable-IDs are system generated and ensure privacy for each party to the transaction. If the entity chooses, readable names can be appended. For a Payer Entity and Payee Entity, Immutable-IDs are assigned to the respective PRA and digital wallet. In block 304, a PRA 220 for each entity is initialized. In block 306, a Payment Processor 108 is associated. In block 308, the digital wallets 228a, 228b for the Payer Entity 104 and Payee Entity 106 are initialized. The digital wallets are implemented on a respective computing device of the Payer Entity and Payee Entity as described in greater detail below. In block 310, Payer Entity 104 initiates a purchase from Payee Entity 106 by unlocking digital wallet 228a.

In block 312, Payee Entity 106 interacts with Payer Entity 104 via digital wallet 228b, 228a, respectively, to obtain a digital wallet public key (digital certificate). This interaction is called a request for identification (RFI), and it occurs at the beginning of the payment transaction process. Different methodologies may be employed to exchange information between the Payee Entity digital wallet 228b and the Payer Entity digital wallet 228a, based on the transaction scenario. For example, mobile communication device information can be exchanged with a POS terminal using Near Field Communication (NFC) or other short-range communication protocols such as BLUETOOTH, Wi-Fi 802.11xx, ZIGBEE, etc. NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication, which may have different operating frequencies, effective ranges, etc., for example, may also be also used. Alternatively, desktop or laptop information might be exchanged online over Transport Layer Security (TLS).

Certificates are based, for example, on the X.509 version 3 standard (with some extensions). The protocol used to exchange information is handled by the respective digital wallet application. Encryption for the information exchange is implemented by the digital wallet application via a key exchange. Examples of payee digital wallet may include an application executing on a processor of a POS system, a Web Site's checkout function, or even another entity's smartphone.

An exemplary RFI request may be in the following format:

```
{
    Signed using the Payee Entity digital wallet private key
    {
    Payee Entity PRA Immutable-ID: <Immutable-ID>
    Payee Entity digital wallet's Immutable-ID: <Immutable-ID>
    Payee Entity PRA Certificate <Certificate>
    Payee Entity digital wallet Certificate: <Certificate>
    }
}
```

In block 314, Payer Entity 104 sends data representative of an RFI reply over the same communication channel in the following format:

```
{
    Signed using the Payer Entity digital wallet private key
    {
    Payer Entity PRA Immutable-ID: <Immutable-ID>
    Payer Entity digital wallet Immutable-ID: <Immutable-ID>
    Payer Entity PRA Certificate: <Certificate>
    Payer Entity digital wallet certificate: <Certificate>
    }
}
```

In block 316, Payee Entity 106 generates a DDO (request for payment) that includes relevant purchase metadata (i.e., currency and preferred payment provider(s)). Payee Entity digitally signs the DDO using the Payee Entity digital wallet private key. The DDO may be constructed in the following format:

```
{
    Signed with Payee's Digital Wallet's private key
    {
    Transaction Step: Request for Payment
    Transaction ID: <Hash>
    Payee Entity Immutable-ID: <Immutable-ID>
    Payee Entity digital wallet's Immutable-ID: <Immutable-ID>
    Payee Entity digital wallet's Certificate: <Certificate>
    Ownership Transfer: <Payer Entity PRA Certificate>
    Amount: XXX
    Currency: USD/Bit coin/etc.
    Preferred Payment Providers: <Collection of PRA Certificates>
    Other Transaction Metadata: XXX
    }
}
```

In block 318, Payer Entity 106 sends data representative of the digitally signed DDO to Payee Entity 104 over a communication channel (i.e., NFC, BLUETOOTH, TLS, etc.)

In block 320, Payer Entity 104 checks the validity of the DDO by verifying the digital signature and: (1) checking whether the Payee Entity PRA certificate and the Payee Entity digital wallet have expired; (2) checking the revocation status of the Payee Entity PRA certificate and the Payee Entity digital wallet certificate using the Online Certificate Status Protocol (OCSP) from the PRP 202; and (3) checking the trust rating for the Payee Entity PRA certificate and the Payee Entity digital wallet certificate from the PRP 202 using a REST Application Protocol Interface (API).

If not online, the Payer Entity digital wallet 228a checks whether the Payee Entity PRA certificate and the Payee Entity digital wallet certificate have expired, and if cached from prior transactions, checks the trust rating for the Payee Entity PRA certificate and the validity of the Payee Entity digital wallet certificate from the Payer Entity digital wallet transactions cache.

In block 322, Payer Entity 104 is prompted to unlock digital wallet 228a. It will be appreciated that different methodologies for unlocking digital wallet 228a may be employed, depending on the particular digital wallet application. For example, biometric or PIN authentication can be used to unlock a digital wallet 228a on a mobile communications device.

In block 324, Payer Entity 104 is presented with a risk score for the transaction and a summary of the transaction information. Based on the risk score, Payer Entity 104 is presented with the option to approve or decline the transaction in decision block 326.

In block 328, Payer Entity 104 selects a payment provider to process the payment and digitally signs the DDO with the digital wallet private key. The approved and signed DDO can take the following format:

```
{
    Signed with Payer Entity digital wallet private key
    {
    Transaction Step: Payment Approval
    Payer Entity Immutable-ID: <Immutable-ID>
    Payer Entity digital wallet Immutable-ID: <Immutable-ID>
    Payer Entity digital wallet Certificate: <Certificate>
    Ownership Transfer: <Payer Entity PRA Certificate>
    Chosen Payment Provider: <Payment Provider's PRA Certificate>
    Expiration Date: <Date / Time>
        Signed with Payee Entity digital wallet private key
        {
        Transaction Step: Request for Payment
        Transaction ID: <Hash>
        Payee Entity Immutable-ID: <Immutable-ID>
        Payee Entity digital wallet Immutable-ID: <Immutable-ID>
        Payee Entity digital wallet Certificate: <Certificate>
        Ownership Transfer: <Payer Entity PRA Certificate>
        Amount: XXX
        Currency: USD/Bitcoin/etc.
        Preferred Payment Providers: <Collection of PRA Certificates>
        Other Transaction Metadata: XXX
        }
    }
}
```

In block 330, Payer Entity 104 sends data representative of the digitally signed and validated DDO representing payment approval to Payee Entity 106 over a communication channel.

In block 332, Payee Entity 106 verifies the digital signature of the DDO received from Payer Entity 104 and then performs the following: (1) checks whether the Payer Entity PRA, the Payer Entity digital wallet certificate, and the chosen Payment Processor PRA certificate have expired; (2) checks the revocation status of the Payer Entity PRA certificate, the Payer Entity digital wallet certificate, and the chosen Payment Processor PRA certificate using OCSP from the PRP 202; and (3) then checks the trust rating for the Payer Entity PRA certificate, the Payer Entity digital wallet certificate, and the chosen Payment Processor PRA certificate from the PRP 202 using a REST API.

If not online, the Payee Entity digital wallet 228b checks whether the Payer Entity PRA certificate, the Payer Entity digital wallet certificate, and the chosen Payment Processor PRA certificate have expired, and if cached from prior transactions, checks the trust rating and validity for the Payer Entity PRA certificate, the Payer Entity digital wallet certificate, and the chosen Payment Processor PRA certificate from the Payee Entity digital wallet transactions cache, and supported payment methods hosted by the chosen Payment Processor. Based on the information provided from the offline cache, payee 106 can choose to approve or decline the transaction.

In block 334, Payee Entity 104 is presented with a risk score for the transaction and a summary of the transaction information. Based on the risk score, Payee Entity 106 is presented with the option to approve or decline the transaction in decision block 336.

At block 338, Payee Entity 106 verifies Payment Processor 108.

If proceeding with the transaction and online, Payee Entity 106 will then query the payment provider's service point 226 for supported payment methods using a REST API. If the Payee Entity 106 uses one of the returned supported payment methods, it will proceed with the transaction. If not, at block 342 the transaction is declined by the Payee Entity. If proceeding with the transaction, the Payee Entity 106 generates an encrypted remittance statement using the Payment Processor's service point public certificate, which is then embedded into the DDO.

Next, at block 344 the Payee Entity submits the DDO over TLS to the payment provider's service point 226 for payment. If the Payee Entity 106 is offline, the Payee Entity proceeds to complete the transaction at their own risk without verification of funds or ability to process the payment request. Then next time the Payee Entity is online, the DDO is submitted over TLS to the payment provider's service point 226 for payment.

An exemplary format for the DDO (payment submission) is as follows:

```
{
    Signed with Payee Entity digital wallet private key
    {
    Transaction Step: Payment Submission
    Payee Entity Immutable-ID: <Immutable-ID>
    Payee Entity digital wallet Immutable-ID: <Immutable-ID>
    Payee Entity digital wallet Certificate: <Certificate>
    Ownership Transfer: <Payment Processor's PRA Certificate>
    Remittance Statement: <Encrypted Meta Data>
        Signed with Payer Entity digital wallet private key
        {
        Transaction Step: Payment Approval
        Payer's Immutable-ID: <Immutable-ID>
        Payer Entity digital wallet Immutable-ID: <Immutable-ID>
        Payer Entity digital wallet Certificate: <Certificate>
        Ownership Transfer: <Payer Entity PRA Certificate>
        Chosen Payment Provider: <Payment Provider's PRA Certificate>
        Expiration Date: <Date / Time>
            Signed with Payee Entity digital wallet private key
            {
            Transaction Step: Request for Payment
            Transaction ID: <Hash>
            Payee Entity Immutable-ID: <Immutable-ID>
            Payee Entity digital wallet Immutable-ID: <Immutable-ID>
            Payee Entity digital wallet Certificate: <Certificate>
            Ownership Transfer: <Payer's PRA Certificate>
            Amount: XXX
            Currency: USD/Bitcoin/etc.
            Preferred Payment Providers: <Collection of PRA Certificates>
            Other Transaction Metadata: XXX
            }
        }
    }
}
```

In block 346, Payment Processor 108 always verifies the digital signature of the DDO received from Payee Entity 106. Payment Processor 108 then verifies the Payer Entity 104 and Payee Entity 106. For Payee Entity verification, Payment Processor 108 checks whether the Payee Entity PRA certificate and the Payee Entity digital wallet certificate have expired; checks the revocation status of the Payee Entity PRA certificate and the Payee Entity digital wallet certificate using OCSP from the PRP 202; and checks the trust rating for the Payee Entity PRA certificate and the Payee Entity digital wallet certificate from the PRP 202 using a REST API.

To verify the Payer Entity, Payment Processor 108 checks whether the Payer Entity PRA certificate and the Payer Entity digital wallet certificate have expired; check the revocation status of the Payer Entity PRA certificate and the Payer Entity digital wallet certificate using OCSP from the PRP 202; checks the trust rating for the Payer Entity PRA certificate and the Payer Entity digital wallet certificate from the PRP 202 using a REST API; checks whether the Payer Entity PRA certificate is associated with an account of Payment Processor 108; and determines if the Payer Entity's account can cover the requested remittance amount.

In block 348, Payment Processor 108 calculates a combined risk score for the transaction. This risk score is a composite of the trust ratings for the Payee Entity and the Payer Entity, the status of the Payer Entity account, and other indicators of risk related to the Payment Processor's operations.

At block 350, based upon the resulting risk score, processor 108 will either reject or proceed with the requested remittance action. A remittance decision is either reject or proceed to ensure privacy regarding the reasons for rejection. If a Payer Entity 104 wishes to know the reason for why a payment was rejected, the associated Payer Entity digital wallet 228*a* can make a separate request to the Payment Processor 108 for details regarding the remittance decision.

At block 352, the Payment Processor 108 updates the DDO with the remittance decision information, passes the finalized DDO back to Payee Entity 106 at block 354, and updates the PRP hosted Global Transaction log with the finalized DDO via a REST API to the PRP 202. Lastly, if the remittance decision is to proceed with the requested remittance action, the Payment Processor 108 processes the payment using the remittance information provided by the Payee Entity at block 358.

For online transactions the Payee Entity 106 can choose to pass the finalized DDO back to the Payer Entity 104 as part of a separate receipt process. Irrespectively, the Payer Entity 104 can request the finalized DDO from the PRP 202 hosted Global Transaction Log.

The updated DDO from Payment Processor 108 can be in the following format:

```
{
    Signed with Payment Processor Service Point's private key
    {
    Transaction Step: Payment Remittance
    Payment Processor Immutable-ID: <Immutable-ID>
    Payment Processor Service Point's Immutable-ID: <Immutable-ID>
    Payment Processor Service Point's Certificate: <Certificate>
    Ownership Transfer: <PRP's Certificate>
    Remittance Decision: <Reject or Proceed>
        Signed with Payee Entity digital wallet's private key
        {
        Transaction Step: Payment Submission
        Payee Entity Immutable-ID: <Immutable-ID>
        Payee Entity digital wallet Immutable-ID: <Immutable-ID>
        Payee Entity digital wallet Certificate: <Certificate>
        Ownership Transfer: <Payment Processor PRA Certificate>
        Remittance Statement: <Encrypted Meta Data>
            Signed with Payer Entity digital wallet private key
            {
            Transaction Step: Payment Approval
            Payer Entity Immutable-ID: <Immutable-ID>
            Payer Entity digital wallet Immutable-ID: <Immutable-ID>
            Payer Entity digital wallet Certificate: <Certificate>
            Ownership Transfer: <Payer Entity PRA Certificate>
            Chosen Payment Provider: <Payment Provider's PRA Certificate>
            Expiration Date: <Date / Time>
                Signed with Payee Entity digital wallet private key
                {
                Transaction Step: Request for Payment
                Transaction ID: <Hash>
                Payee Entity Immutable-ID: <Immutable-ID>
                Payee Entity digital wallet Immutable-ID:
                <Immutable-ID>
                Payee Entity digital wallet Certificate:
                <Certificate>
                Ownership Transfer: <Payer Entity PRA Certificate>
                Amount: XXX
                Currency: USD/Bitcoin/etc.
                Preferred Payment Providers: <Collection of PRA Certificates>
                Other Transaction Metadata: XXX
                }
            }
        }
    }
}
```

Figure 4:
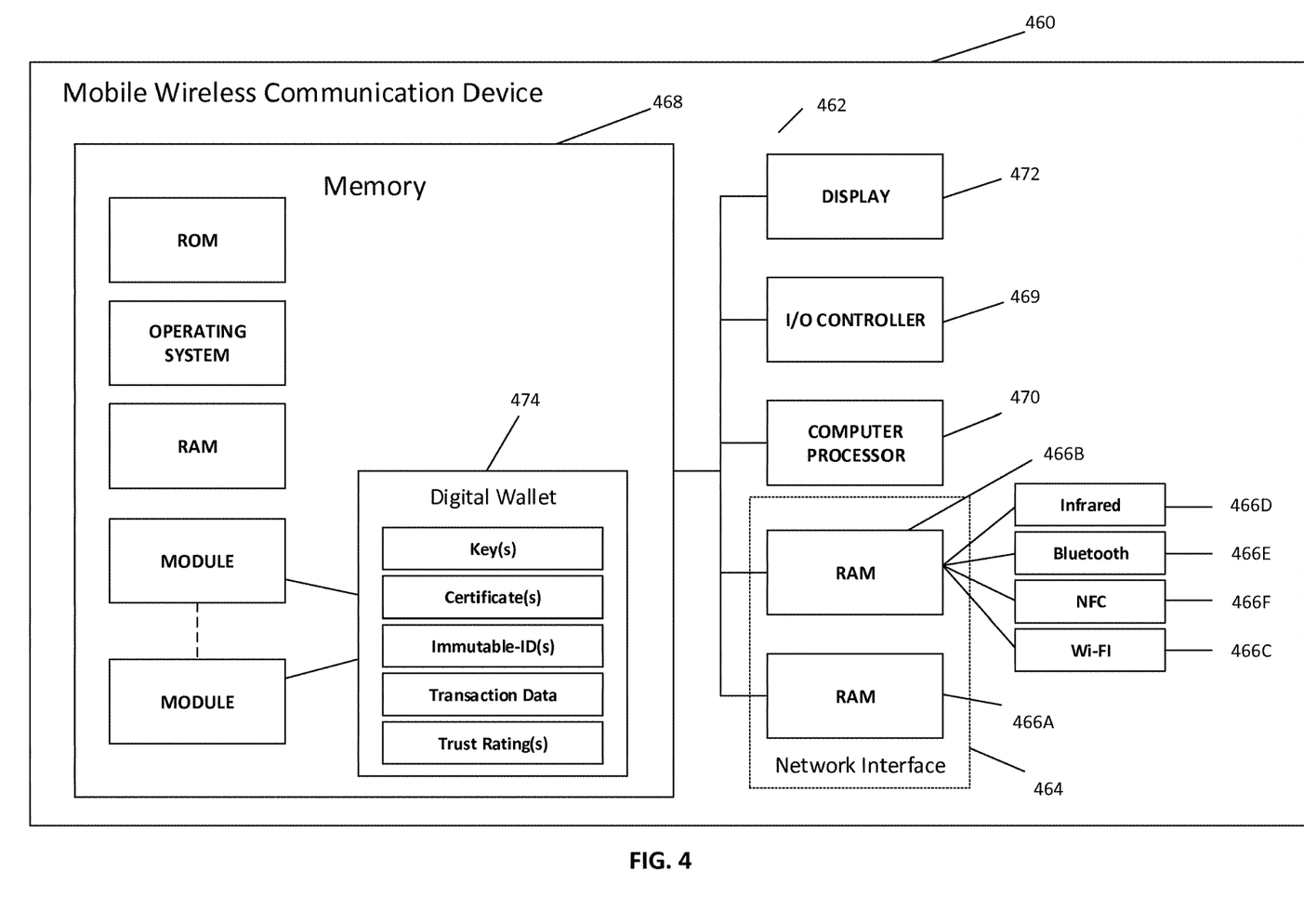
FIG. 4 is a high-level schematic diagram of an illustrative mobile wireless communications device configured for carrying out aspects of the disclosure.

Referring to FIG. 4, there is depicted a high-level schematic diagram of an exemplary computing device associated with a Payer Entity 104, such as for example, a mobile wireless communications device 460 configured for carrying out aspects of the disclosure. While the illustrative computing device is shown and described as a mobile wireless communications device, it will be appreciated that the computing device may be embodied in a desktop or laptop computer, tablet, personal digital assistant (PDA), or like apparatus configured with data network connectivity. The illustrative mobile wireless communications device 460 includes a housing 462, and a network interface/wireless transceiver 464 disposed in the housing. The wireless transceiver 464 may comprise one or more of a cellular transceiver 466*a* and a short-range communications transceiver 466*b*. Transceiver 466*b* may include an infrared transceiver 466*c*, transceiver 466*d* for communicating with a wireless local area network (WLAN), a BLUETOOTH transceiver 466*e*, and NFC device 466*f*. A memory 468 stores machine-executable program instructions and includes random access memory (RAM), read only memory (ROM) and an operating system stored in persistent memory. An I/O controller 469 is coupled to a central communications bus, and memory 468 is operably coupled to at least one computer processor 470 that executes the stored program instructions. A display 472 is coupled to computer processor 470 in a conventional fashion.

Computer processor 470 executes application program instructions stored in memory 468 in the form of at least one module to implement a digital wallet 474 in accordance with the foregoing description. The digital wallet is provisioned by exchanging data (i.e., keys (s), certificate(s), and Immutable-ID(s)) with PRP 202 as described above. For communications with a POS terminal of a Payer Entity 106, processor 470 directs short-range data communications via NFC device 466*f* according to the NFC protocol, or alternatively via any other short-range communication protocol via transceiver 464 (i.e., infrared, BLUETOOTH, Wi-Fi, etc.), or over a cellular data network. Data communications with PRP 202 may be similarly implemented. Other details of mobile wireless communications device 460 need not be described in detail herein.

Figure 5:
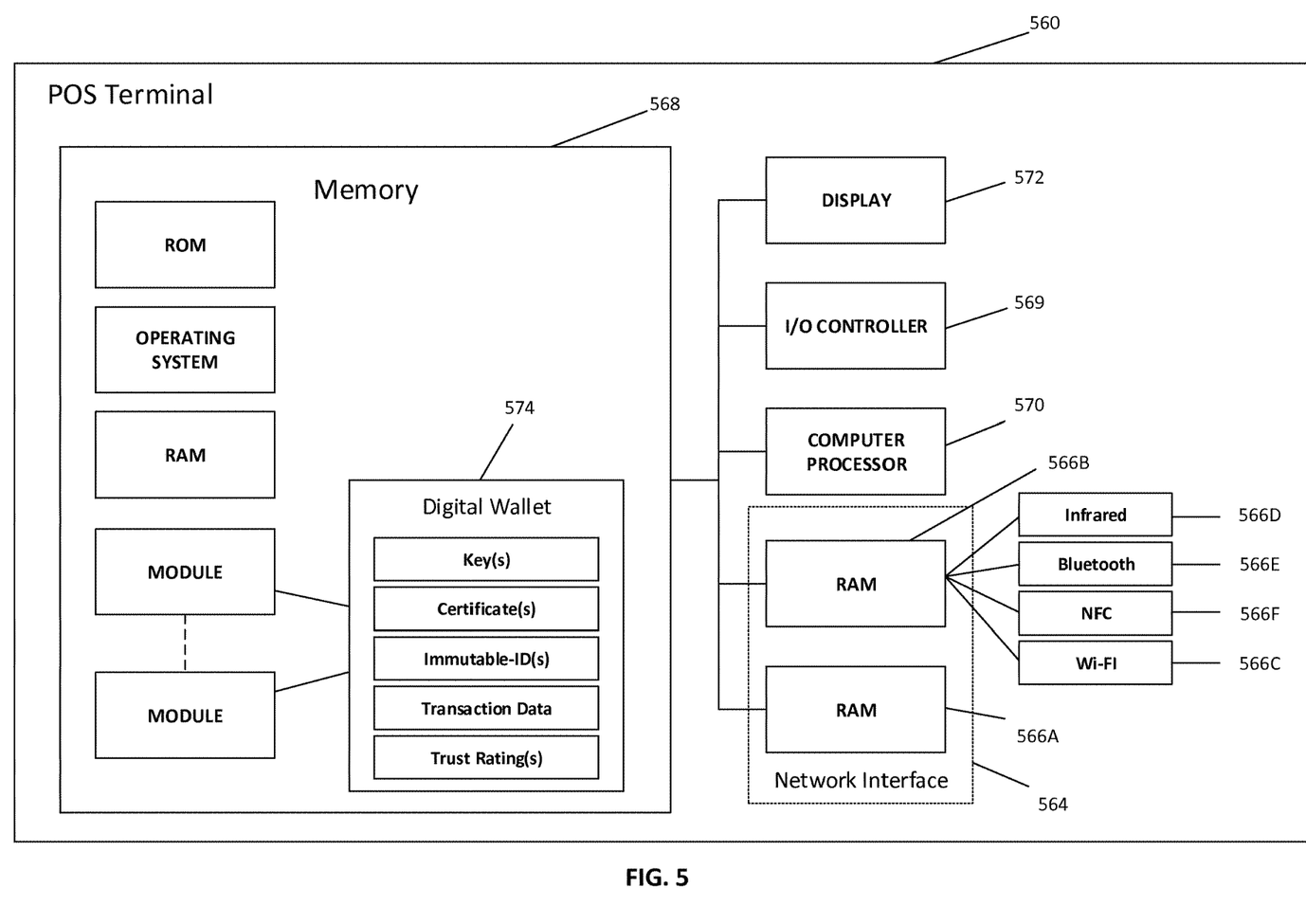
FIG. 5 is a high-level schematic diagram of an exemplary POS terminal configured for carrying out aspects of the disclosure.

Referring to FIG. 5, there is depicted a high-level schematic diagram of an exemplary POS terminal 560 associated with a Payee Entity 108. POS terminal 560 illustratively includes a wireless transceiver 564, which may comprise one or more of a cellular transceiver 566*a* and a short-range communications transceiver 566*b*. Transceiver 566*b* may include an infrared transceiver 566*c*, Wi-n transceiver 566*d* for communicating with a wireless local area network (WLAN), a BLUETOOTH transceiver 566*e*, and NFC device 566*f*. A memory 568 stores machine-executable program instructions and includes random access memory (RAM), read only memory (ROM) and an operating system stored in persistent memory. An I/O controller 569 is coupled to a central communications bus, and memory 568 is operably coupled to at least one computer processor 570 that executes the stored program instructions. A display 572 is coupled to computer processor 570 in a conventional fashion.

Computer processor 570 executes application program instructions stored in memory 568 in the form of at least one module to implement a digital wallet 574 in accordance with the foregoing description. As with the Payer Entity, the digital wallet is provisioned by exchanging data (i.e., keys(s), certificate(s), and Immutable-ID(s)) with PRP 202 as described above. For communications with a mobile wireless communications device 560 of Payer Entity 104, processor 570 illustratively directs data communications via NFC device 566 in accordance with the NFC protocol, or alternatively communicates with the wireless communications device 460 via any other short-range communication protocol via the WLAN transceiver 564, or over the cellular network. Alternatively, the POS terminal 560 may communicate with the Payer Entity's computing device 460 over TLS. Data communications with PRP 202 may be similarly implemented.

Figure 6:
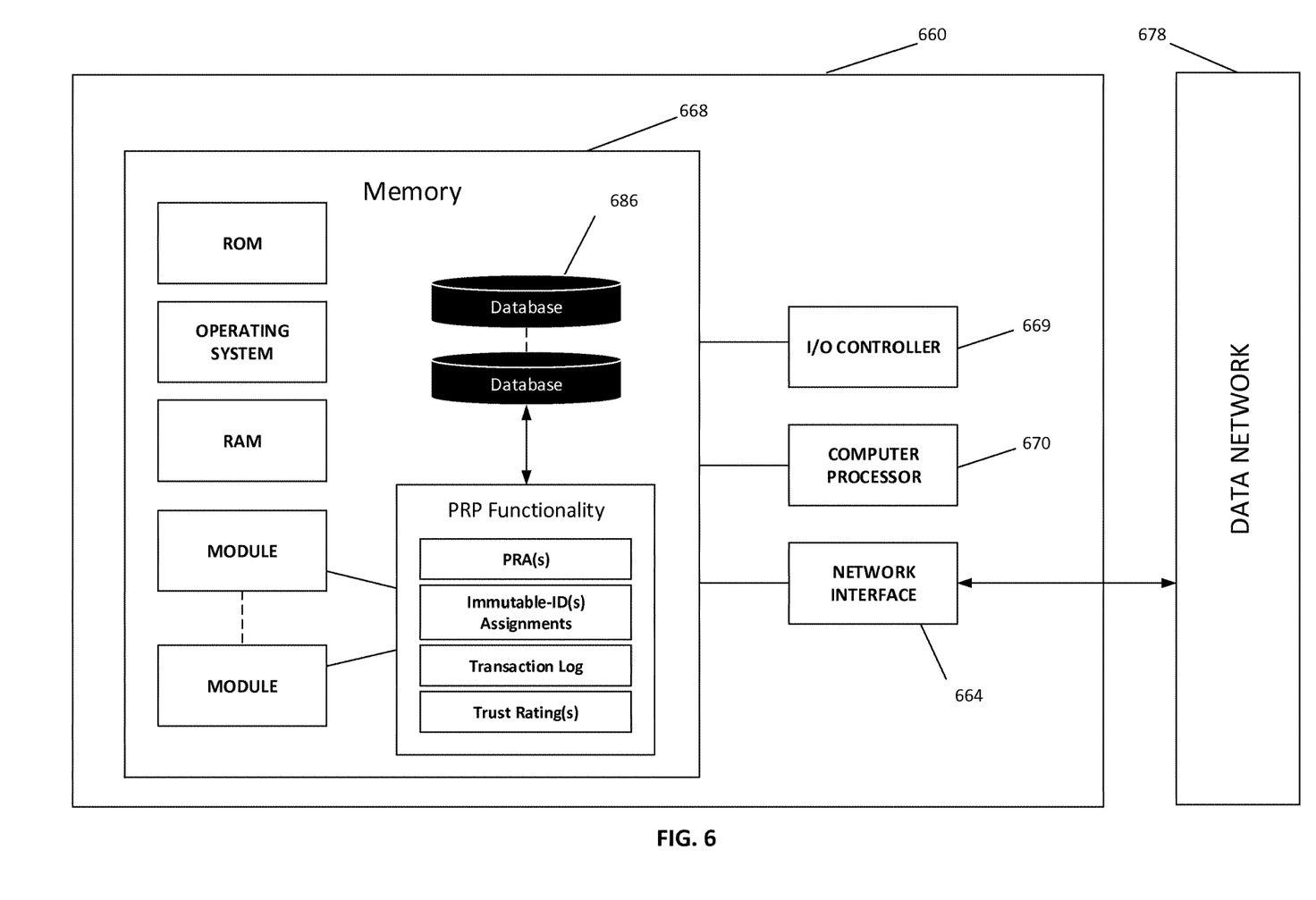
FIG. 6 is a high-level schematic diagram of an exemplary Payment Root Provider configured for carrying out aspects of the disclosure.

FIG. 6 is a high-level schematic diagram of an exemplary PRP 660 for carrying out aspects of the disclosure. PRP 660 includes a network interface 664 that facilitates data communications with a communications network 678, and at least one computer processor 670. A memory 668 stores Machine-executable program instructions and includes random access memory (RAM), read only memory (ROM) and an operating system stored in persistent memory. PRP 660 further includes an I/O controller 669 and data store 686 composed of one or more databases. The computer processor 670 may comprise one more microprocessors, co-processors, or the like, and is in communication with network interface 664 to communicate data via a data network shown generally at 678. The network interface 664 can include a plurality of communication channels for simultaneous communication with other processors, servers, etc. At least one module includes an application(s) comprising program code that is executed by computer processor 670 to implement token-based transactions in accordance with aspects of the disclosure. The processor 670 initializes and maintains PRAs and assigns Immutable-IDs and certificates to all entities forming part of the transaction system. Immutable-IDs 694 may be generated by the IdP 224. A Transaction Log is maintained in data store 686 and updated by processor 670 as described above. Further, processor 670 stores and maintains Trust Ratings for all entities in the system.

Figure 7:
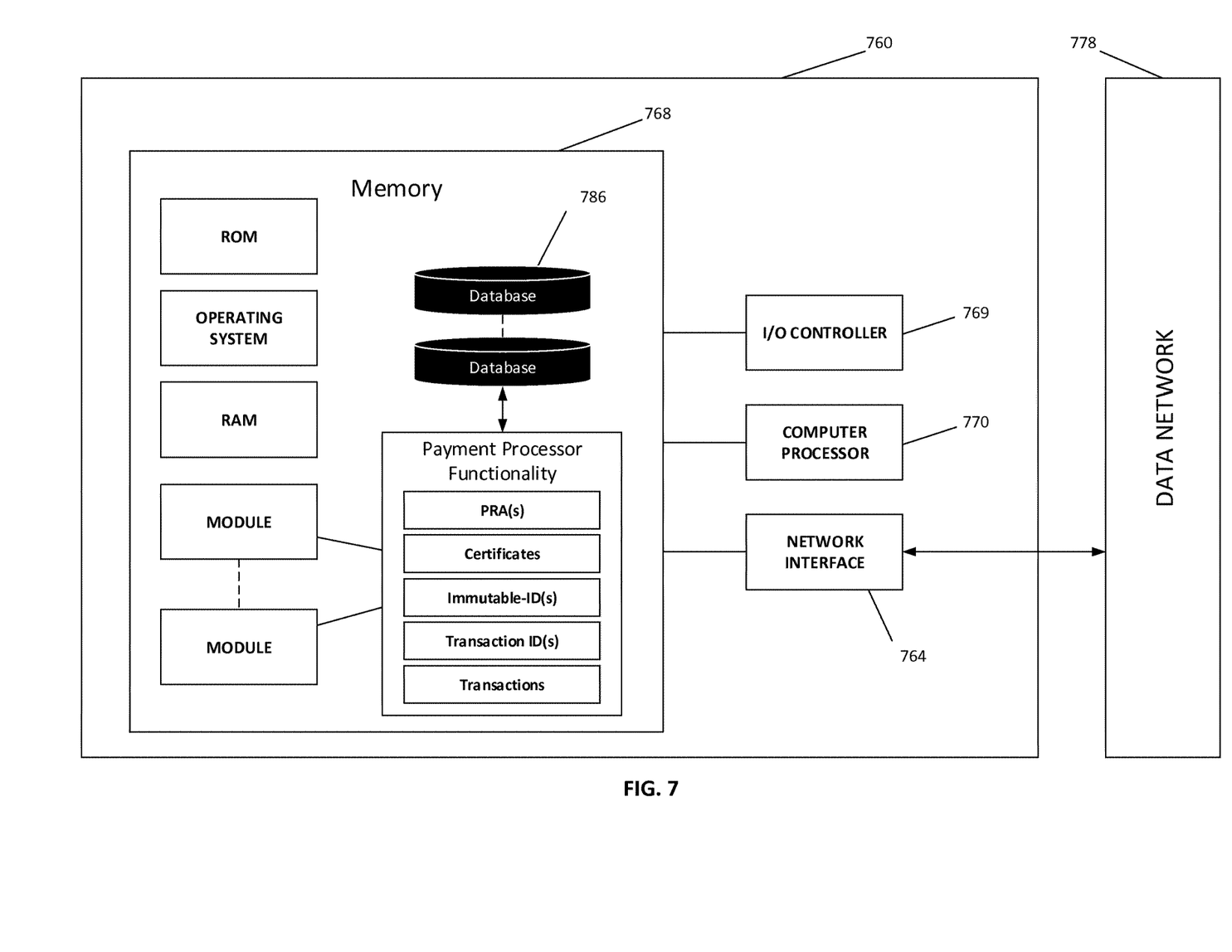
FIG. 7 is a high-level schematic diagram of an exemplary Payment Processor configured for carrying out aspects of the disclosure.

Referring to FIG. 7, there is depicted a high-level schematic of an illustrative Payment Processor 760 (service point) in accordance with an aspect of the disclosure. Payment Processor 760 includes a network interface 764 that facilitates data communications with a communications network shown generally at 778, and at least one computer processor 770. Memory 768 stores machine-executable program instructions and includes random access memory (RAM), read only memory (ROM) and an operating system stored in persistent memory. Payment Processor 760 further includes an I/O controller 769 and a data store 786 comprised of one or more databases. The computer processor 770 may comprise one more microprocessors, co-processors, or the like, and is in communication with network interface 764 to communicate data via a data network 778. The network interface 764 can include a plurality of communication channels for simultaneous communication with other processors, servers, etc. At least one module includes an application(s) comprising program code that is executed by computer processor 680 to implement the token-based transactions as described above.

The present disclosure may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions, like the processes are presented in terms of algorithms and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on one computer, partly on the computer, as a stand-alone software package, partly on the first computer and partly on a remote computer or entirely on the remote computer or server. In the latter scenario, the remote computer may be connected to the first computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The drawings and the description above relate to various embodiments by way of illustration only. It is noted that wherever practicable similar or like reference numbers may be used in the drawings and may indicate similar or like functionality. The drawings depict embodiments of the disclosed system (or method) for purposes of illustration only. One skilled in the art will readily recognize from the following description that alternative embodiments of the structures and methods illustrated and described herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

Also, some embodiments of the system may be further divided into logical modules. One of ordinary skill in the art will recognize that a computer or another machine with instructions to implement the functionality of one or more logical modules is not a "general purpose" computer. Instead, the machine is adapted to implement the functionality of a particular module. Moreover, the machine embodiment of the system physically transforms the electrons representing various parts of content and data representing user interaction with the content into different content or data representing determined resonance.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for facilitating non-cash payments between entities without using personally identifiable information data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A system for facilitating non-cash payments between entities without using personally identifiable information data, comprising:
    memory;
    a processor;
    a module, which when executed by the processor, causes the computer processor to perform the steps of:
    joining into a common framework a payer entity, a payee entity and a payment processor comprising a computerized entity processing payment and transfer funds to different merchants for purchased goods and/or services;
    initializing a payment root account (PRA) for each of the entities and associating the PRA with a corresponding payment root provider (PRP) acting as a trusted third party for a transaction and serving as a root of trust for the system;
    generating in an identity provider that is separate from each PRA of each of the entities, an immutable identifier for each PRA;
    assigning each said immutable identifier to each PRA associated with a corresponding PRP by said identity provider;
    initializing a digital wallet on a respective computing device of each of the payer and payee entities;
    receiving from over a wireless computer communications link, a payment request from the payer entity to pay the payee entity, the payment request comprising an assigned immutable identifier for an associated PRA of the payee entity, and also an assigned immutable identifier for a digital wallet of the payee entity, a digital certificate of the associated PRA and a digital certificate of the initialized digital wallet on the respective computing device of the payee entity;
    generating an encrypted digital debt obligation (DDO) comprising an encrypted token;
    digitally signing the DDO with a digital signature using a digital wallet private key of the payee entity;
    calculating a combined risk score for the transaction comprising a composite of the trust rating, the status of an account for the payer entity, and at least one other indicator of risk related to the payment processor;
    presenting the combined risk score for the DDO and a prompt to approve the payment request; and,
    upon receipt of an approval of the payment request, selecting a payment provider, signing and verifying the DDO, verify the payment processor, calculate a composite risk score, prompt an end user to proceed or reject the payment request and, on condition that the payment risk is accepted and not rejected, updating the DDO with remittance information, processing payment in accordance with the payment request and updating the PRP hosted global transaction log with a final version of the DDO.

2. The system as recited in claim 1, wherein the DDO comprises:
    payment submission;
    a request for payment;
    a transaction ID;
    the payee entity immutable-ID;
    the payee Entity digital wallet immutable-ID;
    the payee entity digital wallet certificate;
    the payer entity PRA certificate.

3. The system recited in claim 1, wherein data representative of a signed RFI reply is received from the Payer Entity including:
    a payer entity PRA immutable-ID;
    a payer entity digital wallet immutable-ID; and,
    a payer entity digital wallet immutable ID.

* * * * *